United States Patent
Monet et al.

(10) Patent No.: US 8,386,437 B2
(45) Date of Patent: Feb. 26, 2013

(54) APPARATUS AND METHOD FOR DOCUMENT COLLECTION AND FILTERING

(75) Inventors: Nicolas Monet, Montbonnot-Saint-Martin (FR); Michel Gastaldo, Saint Ismier (FR); Caroline Privault, Montbonnot-Saint-Martin (FR); Jacki O'Neill, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 281 days.

(21) Appl. No.: 12/417,130

(22) Filed: Apr. 2, 2009

(65) Prior Publication Data
US 2010/0257141 A1    Oct. 7, 2010

(51) Int. Cl.
G06F 7/00    (2006.01)

(52) U.S. Cl. ............................................. 707/665

(58) Field of Classification Search ............... 707/665
See application file for complete search history.

(56) References Cited

U.S. PATENT DOCUMENTS

| | | | |
|---|---|---|---|
| 7,139,754 B2 | 11/2006 | Goutte et al. | |
| 7,265,855 B2 | 9/2007 | Patton | |
| 7,370,034 B2 | 5/2008 | Franciosa et al. | |
| 7,382,939 B2 | 6/2008 | Kanatsu | |
| 7,457,808 B2 | 11/2008 | Goutte et al. | |
| 2003/0101187 A1 | 5/2003 | Gaussier et al. | |
| 2005/0086205 A1* | 4/2005 | Franciosa et al. | 707/3 |
| 2005/0086224 A1* | 4/2005 | Franciosa et al. | 707/6 |
| 2006/0184543 A1 | 8/2006 | Fukuta | |
| 2006/0197928 A1 | 9/2006 | Hirai | |
| 2006/0214963 A1 | 9/2006 | Komatsu | |
| 2006/0232594 A1 | 10/2006 | Kanematsu | |
| 2006/0290975 A1 | 12/2006 | Murakami | |
| 2007/0005340 A1 | 1/2007 | Goutte et al. | |
| 2007/0005639 A1 | 1/2007 | Gaussier et al. | |
| 2007/0064121 A1* | 3/2007 | Issa et al. | 348/231.2 |
| 2007/0118760 A1 | 5/2007 | Masui | |
| 2007/0133043 A1 | 6/2007 | Maekawa et al. | |
| 2007/0133054 A1 | 6/2007 | Kobayashi et al. | |
| 2007/0135930 A1 | 6/2007 | Kirisara et al. | |
| 2007/0143101 A1 | 6/2007 | Goutte | |
| 2007/0156694 A1* | 7/2007 | Lim | 707/9 |
| 2007/0239745 A1 | 10/2007 | Guerraz et al. | |
| 2007/0273921 A1 | 11/2007 | Yamakawa | |
| 2008/0038002 A1 | 2/2008 | Ono | |
| 2008/0040350 A1 | 2/2008 | Aoki | |

(Continued)

OTHER PUBLICATIONS

U.S. Appl. No. 12/174,721, filed Jul. 17, 2008, Renders, et al.

(Continued)

Primary Examiner — Shyue Jiunn Hwa
Assistant Examiner — Muluemebet Gurmu
(74) Attorney, Agent, or Firm — Fay Sharpe LLP (57) ABSTRACT

A system and method for document management are provided. The method relies on a logging system which automatically generates image logs for input documents for each job (print, copy, fax, scan, etc.) processed by the multifunction printing device(s) of an organization. The image logs are processed to identify keywords which are the basis of a search for similar documents among those which have been previously archived as well as documents in other accessible document repositories, including Web documents. The method identifies matching documents and optionally also revisions and related documents. A procedure is provided for ensuring that for each document processed by a multifunction device or other image output device of the organization, image data is archived (or identified as a public document without archiving). The method avoids duplication by using a digital matching document, where available, enabling the images of the image log for the input document to be discarded.

18 Claims, 5 Drawing Sheets

U.S. PATENT DOCUMENTS

| | | | |
|---|---|---|---|
| 2008/0100873 | A1 | 5/2008 | Ohtsu |
| 2008/0130884 | A1 | 6/2008 | Matsumoto et al. |
| 2008/0162567 | A1* | 7/2008 | Yamauchi et al. ......... 707/104.1 |
| 2008/0243842 | A1 | 10/2008 | Liang et al. |
| 2008/0249999 | A1 | 10/2008 | Renders et al. |
| 2008/0301757 | A1* | 12/2008 | Demarest et al. ................. 726/1 |

OTHER PUBLICATIONS

U.S. Appl. No. 12/417,110, filed Apr. 2, 2009, Privault, et al.

Ablebits, *Duplicate Email Remover*, for *Microsoft Outlook*, copyright 2003, available at http://www.ablebits.com/outlook-remove-duplicate-emails/index.php, downloaded Mar. 17, 2009.

AL-Software Team, *Duplicate File Detector v4.5.5*, copyright 2001-2009, available at http://www.al-soft.com/dfd/duplicate-file-finder.shtml, downloaded Mar. 17, 2009.

ASHISOFT, *Duplicate Finder*, copyright 2009, available at http://www.ashisoft.com/df.htm.

Canon, *Providing High-Tech Security for Paper Media, imageWARE Job Archive System*, http://www.canon.com/technology/canon_tech/explanation/imageware_jarchive/html, downloads Feb. 20, 2009 and Mar. 16, 2009.

Commvault, *Archive 7.0 for File Systems and NAS*, copyright 1999-2007, http://www.commvault.com/pdf/DS_DA_FileSystems.pdf.

Davis, Stemming the Information Leak from Your Business, *Sinclair Knight Merz Magazine*, Jul. 1, 2008.

Océ Specifications, Océ Scan-To-Archive, *Océ-Technologies B.V.*, The Netherlands, Jun. 2002.

Xerox, *Xerox DocuShare Archive Server*, copyright 2006.

\* cited by examiner

APPARATUS AND METHOD FOR DOCUMENT COLLECTION AND FILTERING

CROSS REFERENCE TO RELATED PATENTS AND APPLICATIONS

The following copending application, the disclosure of which is incorporated by reference in its entirety, is mentioned:

U.S. application Ser. No. 12/174,721, filed Jul. 17, 2008, entitled CATEGORIZER WITH USER-CONTROLLABLE CALIBRATION, by Jean-Michel Renders, Caroline Privault, and Eric Cheminot.

U.S. application Ser. No.12/417,110, filed Apr. 2, 2009, entitled Printer image log system for document gathering and retention, by Caroline Privault, et al.

BACKGROUND

The exemplary embodiment relates to the field of data collection. It finds particular application in connection with a system for filtering and logging collected documents that are processed by an image output device.

Data leakage of information such as designs, marketing strategies, customer lists, etc can have a devastating effect on businesses. The way in which information is treated within a company and the means by which it flows between the people and systems is the primary risk to data security. Whether deliberately or inadvertently, employees can be responsible for information leakage. The widespread availability of image output devices, such as printers, copiers and multifunction devices having multiple functions (printing/copying/scanning/faxing/emailing) provide a ready means for copying and transmitting of confidential documents.

Methods have been developed which attempt to restrict printing or copying of certain confidential documents. However, this requires advanced software both at the document creation stage and at the printer. Another solution would be to store electronically every document that is printed or copied. However, this could entail dedication of a substantial memory capacity considering the large numbers of documents which are printed and copied each day. Additionally, when a leakage is suspected, the processing of all the stored documents to identify those that are confidential could be a time-consuming task.

While data compression or reducing the resolution of the stored images could be used to reduce the memory space occupied, this inevitably results in the loss of some of the image data, which could be an issue if a true copy of the original document is required. Additionally, it may not be desirable to store all documents, for example, if document retention policies of the company are established which encourage destruction of all but the final version of a document.

INCORPORATION BY REFERENCE

The following references, the disclosures of which are incorporated in their entireties herein by reference, are mentioned:

Document matching systems are disclosed, for example, in U.S. Pat. No. 7,370,034, issued May 6, 2008, entitled SYSTEM AND METHOD FOR PERFORMING ELECTRONIC INFORMATION RETRIEVAL USING KEYWORDS, by Alain Franciosa, et al.; U.S. Pub. No. 2005/0086224, published Apr. 21, 2005, entitled SYSTEM AND METHOD FOR COMPUTING A MEASURE OF SIMILARITY BETWEEN DOCUMENTS, by Alain Franciosa, et al.; U.S. Pub. No. 2008/0243842, published Oct. 2, 2008, entitled OPTIMIZING THE PERFORMANCE OF DUPLICATE IDENTIFICATION BY CONTENT, by Tao Liang, et al.

Image logging systems and image processing systems are disclosed, for example, in U.S. Pub. Nos. 2006/0184543; 2006/0197928; 2006/0214963; 2006/0290975; 2006/0232594; 2007/0118760; 2007/0133043; 2007/0133054; 2007/0135930; 2007/0273921; 2008/0038002; 2008/0040350; 2008/0100873; 2008/0130884; and 2008/0162567; and U.S. Pat. No. 7,382,939.

The following publications relate generally to job archiving: U.S. Pub. Nos. 2006/0184543; 2006/0197928; 2006/0232594; 2007/0273921; 2008/0130884 and U.S. Pat. No. 7,382,939.

BRIEF DESCRIPTION

In accordance with one aspect of the exemplary embodiment, a method for document management includes automatically acquiring image logs, each image log comprising image data and an associated record for an input document being processed by one of at least one image output device within an organization. For each of the acquired image logs, similar documents are automatically retrieved. The retrieval includes identifying keywords extracted from the acquired image data and, based on the keywords performing a search among previously acquired documents archived in a computer-readable storage medium and accessible electronic documents stored in at least one other document repository to retrieve similar documents. Where a similar document is retrieved, the method includes computing a measure of similarity between the retrieved similar document and the input document and based on the computed similarity, determining whether the retrieved document is a matching document and, if so, storing a location of the retrieved matching document in a job log which includes, for the input document, a location of each retrieved matching document. A procedure is provided for ensuring that a single version of the input document is archived in the computer-readable storage medium, the version being selected from the captured image data and any identified matching documents, unless the job log indicates that at least one of the retrieved matching document locations is a public document source.

In another aspect, a computer implemented system for document image log acquisition and retrieval includes a capturing component which automatically acquires an image log comprising image data and an associated record for each input document being processed by an image output device. An archiving component is configured for receiving the acquired image data and associated record from the capturing component and archiving the image data and records in an associated archive. A matching system which, for each of the acquired image logs automatically identifies any similar documents, including identifying a set of text elements extracted from text content of the image data, and from these text elements, identifies a subset of the text elements as keywords, the keywords including text elements which have a frequency of occurrence in the text content which is different from previously computed term frequencies of these text elements, and based on the keywords, performs a search among previously acquired image logs archived in a computer-readable storage medium and accessible electronic documents stored in at least one other document repository to retrieve similar documents. Where a similar document is retrieved, the matching system computes a measure of similarity between the retrieved similar document and the input document and based on the computed similarity, determines whether the retrieved document is a matching document and, if so, stores a job log which includes, for the input document, information from the record of the image log and a location of the retrieved document, whereby either the retrieved document or the input document is identified for being automatically or manually archived in the computer-readable storage medium, except where the job log indicates that the location of the retrieved document is a public document source, neither a retrieved nor an input document need be identified for archiving.

In another aspect, a method for document management is provided. The method includes automatically capturing image logs comprising images and job information for all input documents being printed, copied, scanned, or faxed by any one of a plurality of image output devices within an organization, the image output devices being selected from printers, copiers, scanners, fax machines and multifunction devices. For each input document for which an image log is captured, the method includes determining whether a similar document exists by searching in a) an archive which includes previously captured document images or digital versions thereof, b) the organization's document file system, c) optionally a repository of shared documents, and d) public documents. If a similar document is found to exist, the method includes automatically determining whether it is a matching document having a high degree of similarity with the input document or a revision having a lesser degree of similarity with the input document. Where the similar document is found to be a matching document, the method includes storing a location of the similar document and when the matching document is a digital document which is not already located in the archive, the method includes providing for the digital document to be added to the archive and linked to a stored job record for the input document, enabling the images of the image log for the input document to be discarded.

DETAILED DESCRIPTION

The exemplary embodiment provides an apparatus and method for logging and filtering images that are captured or handled through an image output device, such as a multifunctional printer. The images are stored in an archive server in a way which enables mining of their content. The exemplary apparatus provides a way to reduce the quantity of captured image data which is stored, while providing the capability to detect possible information leakage.

The apparatus, referred to herein as an image log management system (ILMS), combines digital document similarity detection with printer image logging and tracing architectures and reduces the risk of over-collection (redundant storage and duplicates i.e., the same documents collected several times as identified through document content-based similarity detection). An additional advantage, in various embodiments disclosed herein, is the ability to cull earlier versions of official documents, thereby complying with document retention policies, which generally aim to retain only the final version of a document, so that in the event of litigation, incomplete or inaccurate prior versions are not produced in response to document production requests.

In various aspects, each collected document is automatically assessed for confidentiality, allowing documents which are not likely to be confidential company documents to be culled from the image collection. The system applies a criterion for evaluating, on-the fly, the degree of confidentiality of the documents processed through a MFD.

In various aspects, the ILMS apparatus is able to control the output management of a document stored through a document management system (DMS), e.g., place restrictions on one or more of printing/faxing/emailing/scanning in addition to usual access controls (such as view, edit, download, etc.).

The exemplary method takes advantage of the image output devices, such as copiers, printers and multi-function devices (MFDs), that an organization such as a company has (sometimes in several offices located in different places or countries). An image logging system (ILS), which may be a part of the ILMS or a separate computer component with memory and a processor, allows all the images captured or handled through each of the company's image output devices (fax, scan, copy, print, email) to be logged. The image logs are sent to the ILMS, where a matching system identifies duplicate images, which can be filtered automatically or by a human editor. The images, and optionally the associated log information, are archived in an archive which is accessible to the company or to an outside provider who can mine the content.

An "image log," as used herein, may include information ("records") together with one or more related images of a job being processed or to be processed by an image output device, such as an MFD. The records may include Job information and User information for the job.

A "job" can be a print job, copy job, scanning job, etc, which has been or is in the process of being output in electronic or hardcopy form, such as a fax, a scan of a hardcopy document, an email, a print job, a digital sound or video recording, indeed any electronically storable data. Each job generally includes a document which is to be output by the image output device, e.g., by printing, copying, or scanning. A print job, for example, generally includes one or more documents to be printed, usually one or more collated copy sets copied from a set of original print job sheets or electronic document page images, from a particular user, or otherwise related, which is associated with a job ticket that provides instructions for printing the document, such as page size, paper type, instructions for duplex or simplex printing, and the like. An image generally may include information in electronic form which is to be rendered on print media by the image forming device and may include text, graphics, pictures, and the like.

A "document," as used herein refers to any form in which text or other content can be stored, such as an electronic image file in which the text is created with a selected font from a finite alphabet of characters (such as a Word document) or an image file in which the document is represented by image data, such as a PDF, jpeg, bitmap, or the like, which generally requires OCR processing for the text to be extracted. A document can be a "matching document" even if its format is different, such that a Word document and a corresponding PDF file captured by copying a hardcopy printout of the Word document are considered to be matching documents (assuming the OCR of the PDF is sufficiently accurate). As used herein an "electronic document" refers to any computer processable document, as opposed to a hard copy document, and encompasses both "digital documents" (such as an original WORD, Plaintext, or HTML version of a document from which text can be extracted without the need for OCR processing) as well as "scanned documents" which are electronic documents comprising image(s) of hardcopy document(s) or which are derived therefrom.

A company may have several image output devices, such as printers, copiers, and/or multi (MFDs), having two or more of printing, scanning, copying, faxing, and emailing capabilities. For the present application, the image output devices and/or network servers supplying them with print jobs serve as image and job information acquisition devices. They are linked to one or more ILS(s) which generate image logs which are processed by the ILMS. The images captured or handled through the image output devices (fax, scan, copy, print, email) can thus be stored in data memory and the content can subsequently be mined to retrieve responsive documents. Every document may be processed in pages and assembled as a job with user information.

Figure 1:
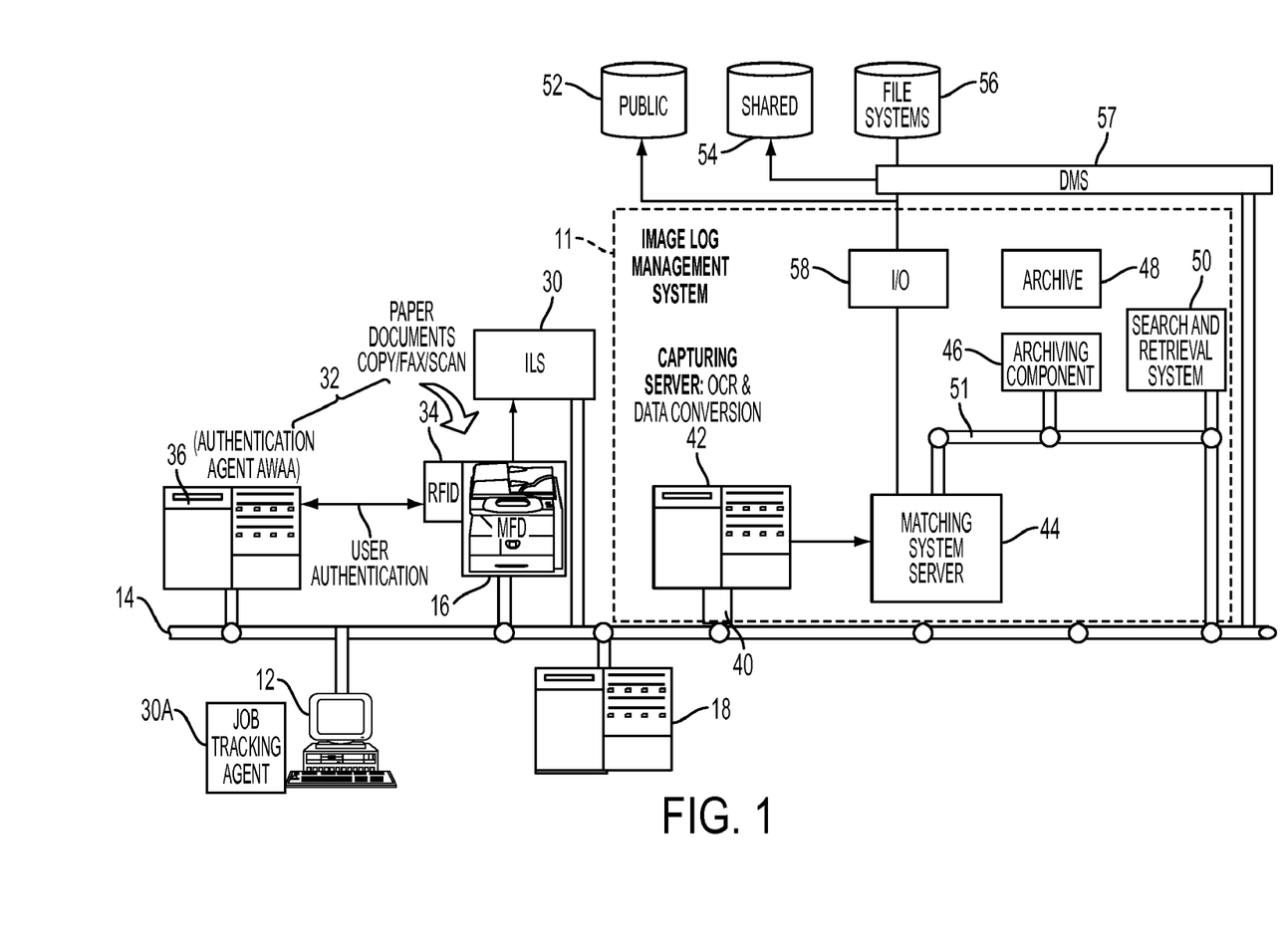
FIG. 1 is a functional diagram of an image logging and management system (ILMS) in an operating environment in accordance with one aspect of the exemplary embodiment.

FIG. 1 illustrates an exemplary print network 10 in which an image log management system (ILMS) 11 operates. The print network 10 includes a plurality of computing devices 12, on which documents may be generated, processed, stored, received and output, e.g., in a page description language (PDL) in the case of a print job. In FIG. 1, an exemplary computing device 12 is illustrated as a client personal computer, although it is to be appreciated that the print network 10 may include many computing devices, such as desktop computers, laptop computers, PDA's and the like. The computing devices 12 are each communicatively linked, e.g., by a wired or wireless network 14, to one or more image output devices 16. In FIG. 1, the output device 16 is illustrated as a multifunction device (MFD) having printing, copying, scanning and faxing capabilities, although it is to be appreciated that the networked image output devices can include printers, scanners, fax machines, and multiples and combinations thereof. The computing device 12 may be linked directly to the output device(s) 16 or linked thereto via a network print server 18.

Figure 2:
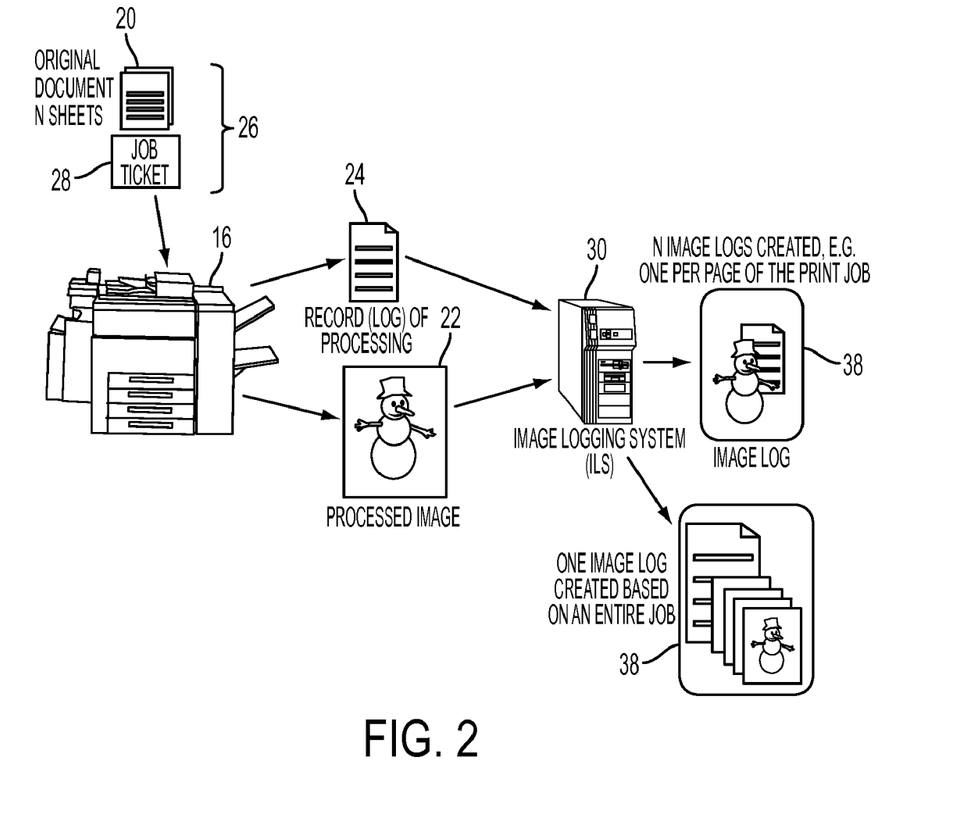
FIG. 2 illustrates a creation of image logs at the job and page levels in accordance with one aspect of the exemplary embodiment.

As illustrated in FIG. 2, for each document 20 handled or captured by each image output device 16 on the network 14 and, more generally, throughout the entire company, image data 22 is acquired, in the form of electronic copies of document images. Log information 24 is also acquired, which may include Job information and User information. The job information may include the number of pages of the print job, number of copies requested, time sent to the MFD, etc. The User information may include the user's name or a unique ID, or IP address of the computing device from which the job was sent. The document images 22 may be acquired by the output device 16, itself. Alternatively, where a print server 18 is intermediate the outputting computer 12 and the output device 16, document images 22 may be acquired by the print server. Log information 24 may be obtained in various ways, depending on the type of document. In the case of a print job 26, the time at which the print job is sent as well as its source may be extracted from the job ticket 28 by an image logging system (ILS) 30, which may be resident in the printer 16 or print server 18. In one embodiment, each client device 12 includes a job tracking agent 30A which serves as all or part of an ILS 30 and which generates log information 24 for each output print job and captures associated image data 22. Such an approach may be implemented, for example, through XEROX® Office Services (XOS) suite of device and asset management software. As illustrated in FIG. 2, the image log may be created for an entire job or for each page of a job or for both the entire job and each page. In the exemplary embodiment, the acquiring of image data for documents resident on a workstation which has not been output for processing by the image output device is precluded from being logged.

In one embodiment, the image acquisition and logging is performed by Fuji Xerox's "Image Logging System" as the ILS 30: this is a software and hardware system for the logging and storing of digital multifunction machine/printer processed logs with corresponding processed images. See, for example, U.S. Pub. Nos. 2006/0290975; 2007/0118760; 2007/0133043; 2007/0133054; 2007/0135930; 2008/0100873; 2008/0038002; and 2008/0040350.

For a copy or scan job, a user identification system 32, such as an radiofrequency identification (RFID) system (FIG. 1), which includes a detector 34 located proximate the output device 16 and a data storage device 36, such as a computer, may automatically identify the person generating the copy or scan, e.g., by detecting information on an RFID device carried by the user. Other methods of acquiring ID information, such as a card reader, user input device such as a keypad, a voice recognition system, biometric system, or the like, may be used to acquire the ID information from the user or otherwise.

Image logs 38 (FIG. 2), each comprising one or more acquired images 22 and associated log information 24, are sent from the ILS 30, e.g., via the network 14, to an input/output component 40 of the ILMS 11. The input component may include, for example, a data input port, modem, network connection, or the like. In the exemplary embodiment, all images passing through the company's output devices 16 are recorded as an image log or logs. There is no provision for a user to select whether an image should be logged by the ILS.

With continued reference to FIG. 1, the ILMS 11 includes a capturing system 42, a matching system, 44, a data archiving system 46, an archive 48, and a retrieval component 50, all communicatively linked via wired or wireless connections, such as illustrated data/control bus 51. The matching system 44 is also linked e.g., via the Internet to a source of public documents 52, such as the world wide web, and also to a repository of shared documents 54, to which the company has access, but which are not universally accessible, and to the company's file storage system(s) 56, that can be accessed, for example, through a Document Management System (DMS) 57, e.g. via one or more input/output devices 58. As used herein, "public documents" 52 are electronic documents which are readily accessible to the public at large, i.e., accessible both to people within and people outside the organization, such as web pages, articles posted on the internet, as well as journal articles and other information accessible by payment of a fee through a web portal, and the like, and thus cannot be considered as confidential company documents or shared documents.

Each of the processing components 42, 44, 46, 50 of the ILMS 11 may be in the form of software and/or hardware. In the exemplary embodiment, each of the components 42, 44, 46, 50 includes software instructions stored in memory which are executed by an associated processor. Each component may have its own memory and processor, or, as illustrated for convenience in FIG. 3, some or all the components may be stored in a common memory 60, and/or linked to a common processor 62, which executed the instructions. The archive 48 may be in the form of a network attached storage (NAS) device or other accessible data storage device or devices with a large memory capacity.

Figure 3:
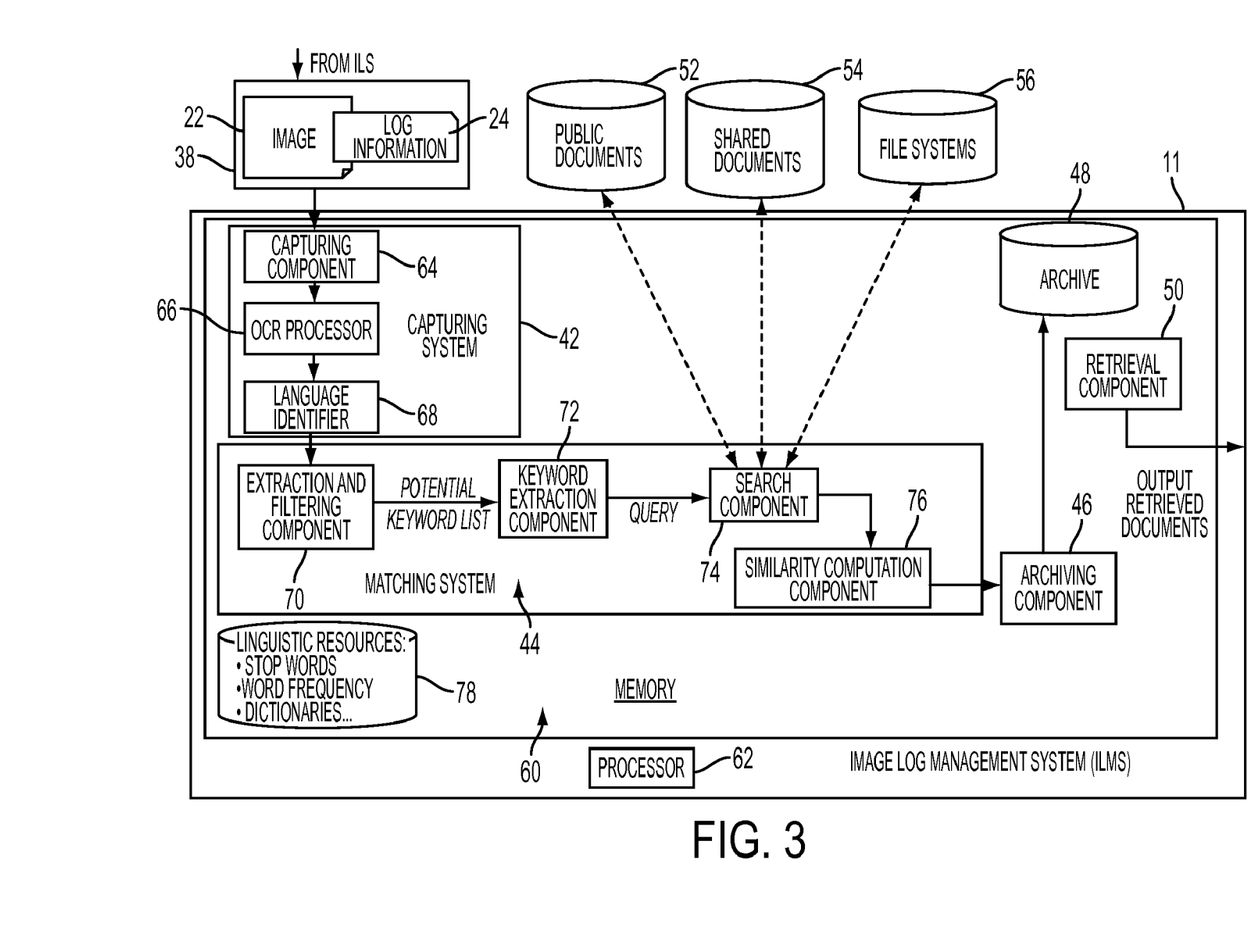
FIG. 3 illustrates the ILMS of FIG. 1, in accordance with one aspect of the exemplary embodiment.

The search and retrieval system 50 allows authorized users to review and search (but not modify or delete) the archived images/log information. The retrieval search and system 50 may be a software application hosted by the server that hosts the ILMS or by a separate computing device with memory and a processor. In one embodiment, the retrieval system includes one or more filters as disclosed in above-mentioned copending application 12/417,110, entitled PRINTER IMAGE LOG SYSTEM FOR DOCUMENT GATHERING AND RETENTION, the disclosure of which is incorporated herein in its entirety, by reference. As disclosed in that application, the filters may include one or more classifiers. Each classifier is trained on a training set of responsive/privileged documents, enabling additional responsive documents to be automatically retrieved from the archive, and privilege logged, as appropriate.

With continued reference to FIG. 3, the capturing system 42 includes a capturing component 64, which captures image logs 38 (images 22 and associated log information 24) for all incoming documents and stores them, e.g., in a volatile portion of computer readable memory, such as in memory 60. The illustrated capturing system 42 may extract additional information from the document images 22. For example it may include an optical character recognition (OCR) component 66, which employs optical character recognition and text processing to retrieve textual content of the document images. A language detection component 68, detects a natural language (e.g., English or French) for the retrieved text. The ILMS 11 may be configured for further processing of documents in only one language, or may have appropriately configured components for more than one language.

The matching system 44 is configured for determining whether similar documents exist in a) the archive 48, b) among publicly available documents 52, c) among shared documents 54, and d) in the company files 56 (these last two categories may be considered equivalent). Further details of the matching system 44 are described below, with reference to FIG. 3.

The data archiving component 46 determines whether the images should be stored, based on the similarity determination, and stores the image logs 38 in the data archive 48. Each archived document may thus comprise one or more document images 22, together with or linked to its log information 24 or information extracted therefrom. The images or the log information may be tagged or otherwise referenced to indicate that there are duplicate images in the database to be reviewed and culled by the Editor. At least one set of log information 24 is stored for each document 20 processed at each machine/printer 16.

The data archive should be sufficiently large to store image logs for several years, in accordance with the company's document retention policy such that, for example image logs for the past 3 years could be searched at once.

Figure 4:
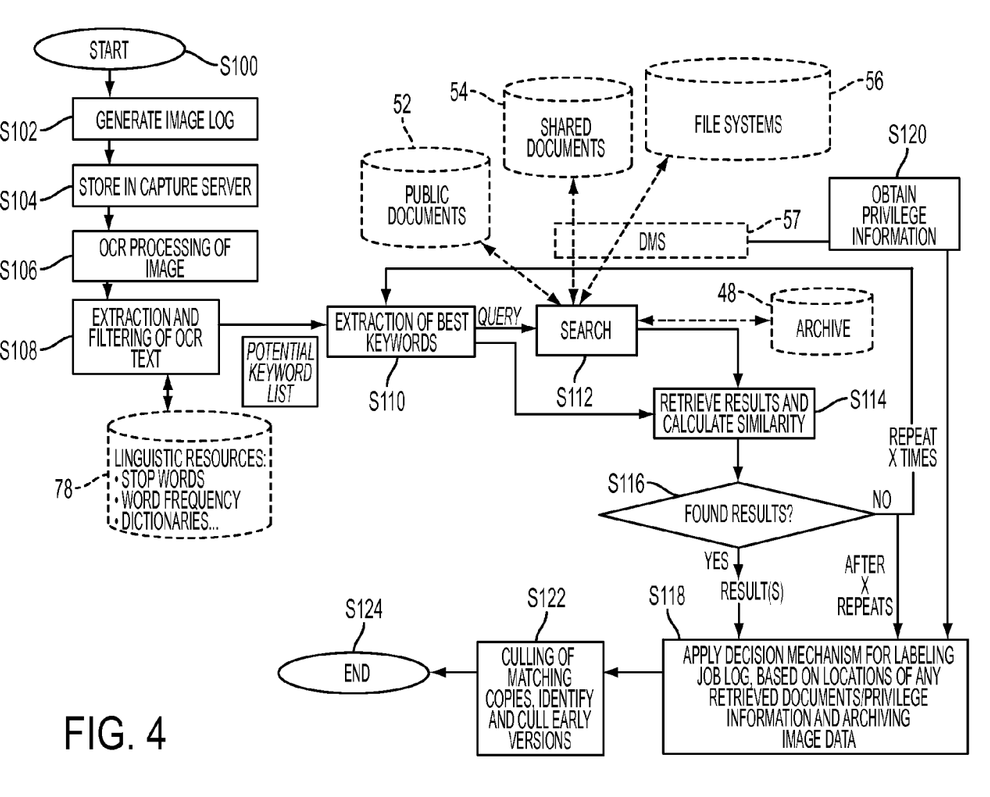
FIG. 4 is a flowchart illustrating a document image archiving and retrieval method which may be performed with the system of FIGS. 1-3 in accordance with another aspect of the exemplary embodiment.

FIG. 4 illustrates an exemplary method of processing image logs, which may be performed with the apparatus of FIGS. 1-3. The method begins at S100.

At S102, an image log 38 is generated (e.g., by ILS 30).

At S104, the image log is received by the ILMS 11 and stored.

At S106, the image 22 is OCR processed, if needed, and optionally its language is recognized.

At S108, the text portion of the document., e.g., generated by the OCR processing of the image, is extracted and filtered to identify a list of text elements as potential keywords.

At S110, a subset of the potential keywords is selected as "best" keywords for a search.

At S112, a search is conducted based on the selected keywords to identify similar documents. The search may include a search for documents in the archive 48 and optionally also in one or more of public documents 52, shared documents 54, and organization file systems 56.

At S114, retrieved similar documents (results) are processed to determine their similarity with the input document.

At S116, if no results were found, the method may return to S110, where keywords are added and/or removed from the list of best keywords to be used in the search. This step may be repeated one or more times, such as about 5 times.

If at S116, results are found, the results are output and at S118, a determination is made as to whether the document image should be added to the archive and any specific tagging/indexing to be applied, based on the search results. If at S116, no results are found (e.g., after 5 loops through steps S110-S114), then at S118 the image data 22 and job log are archived, as usual.

Optionally, at S120, access controls for the document are identified, which can be incorporated in any specific tagging/indexing to be applied in S118.

At S122, provision is made for an administrator to identify the matching documents and to cull them periodically, as appropriate. Early versions may also be identified by the matching system and culled by the administrator. The administrator can be any person or persons having the authority to remove duplicates from the archive. In general, most users are not granted this authority.

The method ends at S124.

Further details of the apparatus and method will now be described.

With particular reference to FIG. 3, the matching system 44 applies filtering rules to decide, for each document processed by the MFD, whether or not it will be logged. The filtering rule is based on the detection of duplicates and the evaluation of the sensitivity of a document: the intent is to avoid archiving the same document several times and/or documents which do not contain sensitive information and to cull 'unofficial' early copies of official documents.

Depending on where the similar documents are found, the matching system tags the images and/or log records accordingly. In particular, the matching system identifies images 22 which are duplicates of previously archived images. The matching component flags the duplicate images and either filters them out before they are archived, or tags or otherwise references them (e.g., storing their locations in a job log for the input document), allowing a human editor who is tasked with the responsibility of reviewing and culling the duplicates to review and cull them from the archive. This reduces the number of images which need to be stored. For duplicate images, only the images themselves, not the log information 24 is discarded. Thus an image 22 in the archive 48 may be linked to two or more sets of log information 24, which generally occupies much less memory than the image data 22.

The illustrated matching system 44 includes an extraction and filtering component 70, a keyword extraction component 72, a search component 74, and a similarity computation component 76. As for the capturing system, each of these components may be in the form of software, hardware, or both. For example, each component 70, 72, 74, 76, is in the form of software instructions stored in memory 60 and which are executed by processor 62. The extraction and filtering component 70 may have access to one or more linguistic resources 78 for identifying keywords in the OCRed text, such as a list of Stop Words (words which have too high a frequency of occurrence in a given language to be useful keywords, word frequencies of words (that are not Stop Words) in the archive, as well as dictionaries for confirming the existence of OCRed words.

For detecting duplicates, i.e., documents whose image has already been logged in the archive system, the matching system 44 may operate as disclosed, for example, in one or more of above-mentioned U.S. Pat. No. 7,370,034, U.S. Pub. No. 2005/0086224, and U.S. Pub. No. 2008/0243842.

In the exemplary embodiment, the matching system 44 takes as input an electronic document (scanned paper document or print ready document) in its entirety or in parts, and attempts to retrieve an electronic version of the document, returning a link indicating the storage location 48, 52, 54, 56 of the document. In addition to finding the location of a document that exactly matches the input document, the matching system 44 can also find other versions or revisions of the document, and optionally also any similar but different (related) documents.

The exemplary matching system 44 is capable of retrieving documents in a variety of electronic formats of a paper document, such as Plaintext, HTML, Microsoft Office, PDF, jpeg, and the like. It is configured for finding the digital electronic versions of shared documents 54, such as those previously indexed by a Document Management System such as DocuShare or SharePoint. It is also configured for locating a public document 52 on the Web and also for searching file systems, such as electronic mail boxes and other document file systems 56 of the organization.

When searching for a similar document, the matching system 44 evaluates a retrieved file according to a computed similarity with the incoming document 22. For example, the matching system 44 may assign one of three similarity levels to the retrieved document: a) a "matching," for a perfect match or where the similarity measure indicates that the two documents are derived from identical paper documents, b) a "revision," indicating that while the documents meet at least a threshold similarity, they are not likely to be identical, and 3) a "related" document, where the documents have some similarity of content they do not meet the threshold for a revision. User-defined parameters can be used to set to specify levels of similarity between the search results and the input document for each of these classes. For example, "matching" documents have a high similarity; "revision" means medium similarity, and "related" corresponds to a low level. Each level is associated with a minimum threshold value on the degree of similarity. This algorithm has proved to be robust to OCR errors.

As shown in FIG. 2, once a paper document has been OCRed to identify text as a sequence of words and other characters ("tokens"), and its language checked, the extraction and filtering system 70 extracts a set of elements (words or multiword expressions), based on the number of times they appear in the input document and their average frequencies in the document language in general and/or in the archive (term frequency are also output. The text element may also be checked against general and/or domain specific dictionaries to make sure they exist. Combinations of elements in word order sequence that satisfy the longest phrase in the dictionaries are identified. The potential keywords are thus generally a subset of the words in the input document, and which may be limited to a predefined number of elements.

From these potential keywords, the keyword extraction component 72 extracts a smaller subset of the elements as "best" keywords for performing the search (S110). Generally, the "best" keywords are elements from the list of potential keywords which are normally used infrequently but which are known to be present in the archive. Various criteria can be used in identifying the best keywords. For example, some of the keywords remaining in the list of keywords may have been identified in one or more domain specific dictionaries of words and phrases in which they are used. Elements may be included in the list of best keywords because their frequency of occurrence in the input document is statistically different, e.g., greater, than naturally occurring frequencies which have been previously computed for these words, e.g., based on their frequency of occurrence within the documents in the archive. These latter keywords and phrases are each assigned a value based on their linguistic frequency of occurrence. A list of the best elements can thus be identified as keywords, based on the frequency of occurrence values, such that each keyword has a value which is greater than other text elements in the list of text elements (except for those keywords belonging to a domain specific dictionary of words and having no measurable linguistic frequency). These best keywords are used to build and run search queries (S112) by the search component 74. In particular, the search is conducted in the archive 48 and other document repositories 52, 54, 56, to retrieve a set of output documents which include all or a threshold number of the keywords.

The retrieved documents are analyzed (S114) by the similarity computation component 76, e.g., by searching for the presence of any of the subset of elements. When all of them are present, the similarity component 76 may look for finer information to distinguish between a "perfect match" and a "revision." When fewer than all, but at least a threshold level, of the subset of elements is found, the result is marked as "related."

For example, for the retrieved documents, a measure of similarity between the input document and each output document may be computed (S114). In determining the measure of similarity, the frequency of occurrence of the keywords in the retrieved document may be compared to that in the input document and the presence of any keywords belonging to a domain specific dictionary of words and having no measurable linguistic frequency may also be taken into account. Based on the similarity score, each document in the retrieved set of documents (or each of those which have at least a threshold similarity score) may be identified as being one of a match, a revision, and a relation of the input document.

The query may be repeated (S116) by adding or removing keywords (such as those identified in domain specific dictionaries and which have no measurable linguistic frequency in the archive) until a predetermined number of results are obtained or the query is terminated because none are found.

Optionally, if the set of retrieved documents includes one classed as a matching document, the identification of keywords and query (S110 and S112) can be repeated using the matching document in place of the input document. This may be useful, for example, if the input document is a relatively poor copy, leading to a poor OCR output.

The retrieved documents are tagged as match, revision, or relation, as appropriate (S114) and/or a list is serialized, e.g., in XML, that contains for each document found: its location and other attributes.

In the exemplary embodiment, the search for similar documents is conducted in the archive 48 as well as in public documents 52, shared documents 54, and file system documents 56. The location from which the similar document is retrieved is identified, for further processing of the similar document. The level of similarity, together with the setting of the searched locations may be determined by the ILMS administrator. The results (retrieved files and their location) are returned and stored, e.g., in the capturing server 42 with additional information. This additional information can be a file type (Plaintext, HTML, Microsoft Office, PDF . . . ), a source type (Archive identifier, Web identifier, Shared Document identifier . . . ), as well as any access restrictions on the repository in which it was located. Based on that result, the data archiving system 46 (which may be resident in the capturing server 42) decides whether or not to store the input document. In making this determination, a process as outlined below may be followed.

Let D be the original document and L the list {R1, R2, . . . ,Rn} of the n exact matches retrieved by the matching component (documents with 100% similarity degree with D). Each document Ri can come from one of various locations such as the ILMS Archive 48, the external Web 52, internal Document Management System 56 or external shared documents 54.

Figure 5:
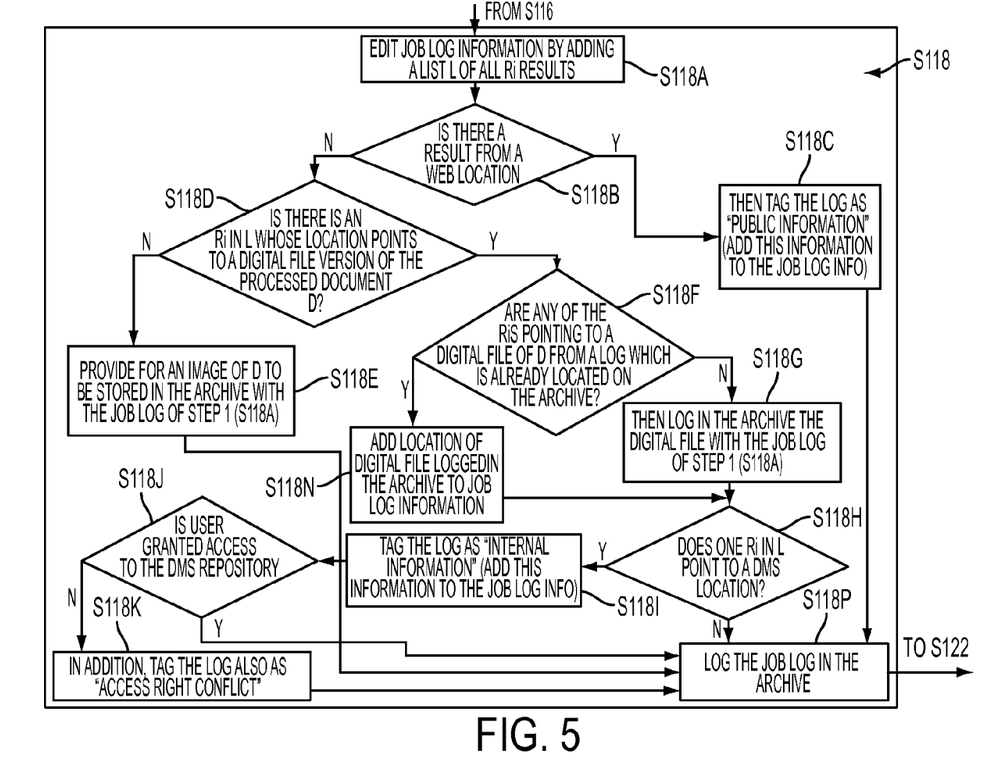
FIG. 5 illustrates a matching step performed in the exemplary method of FIG. 4.

Step S118 may proceed as illustrated in FIG. 5 and shown in the algorithm below:

---

Algorithm

---

STEP 1: Create a job log containing the following data: IP address, User name, Date, Time, etc, which may be obtained from the image log record, with in addition,
the list L of different locations of R1,R2,...,Rn (S118A).
  IF at least one Ri in L points to a Web location (S118B) THEN jump to STEP 3 (S118C).
  STEP 2:
    IF there is no Ri in L whose location points to a digital file version of the processed document D (S118D) THEN bind the acquired image of D to the job log of STEP1. (S118E), which results in the image D being archived, and go directly to STEP 4.
    ELSE IF none of the Ri-s pointing to a digital file of D is located on the ARCHIVE (S118F)
    THEN bind a digital file Ri to the job log of STEP 1, which results in the digital file of D being archived in place of D, and continue (S118G)
    ELSE Add the location of the digital file in the ARCHIVE to the info part of the job log of STEP1 (S118N) and continue.
  STEP 3:
    IF at least one Ri in L points to a Web location THEN tag the log as "Public Information" (add this information to the job log info) (S118C).
    ELSE IF one Ri in L points to a DMS location (S118H) THEN:
    >> tag the log as "Internal Information" (add this information to the job log info) (S118I) and IF the authenticated print user is not granted the access to the DMS repository (S118J) THEN in addition, tag the log also as "Access Right Conflict" (add this information to the job log info) (S118K).
  STEP 4: log the job log in the ARCHIVE (S118P).

---

It is to be appreciated that the 100% similarity degree used in the above procedure can be tuned as a parameter of the ILMS 11, such that a similarity degree of less than 100% may be considered to be an exact match, such as 99% or 98% or 95%. Additionally, while in the above example, there are three search locations: the archive 48, the web 52, and shared/company documents 54, 56, there may be a different number of search locations with different associated tagging rules. As will also be appreciated, in some embodiments, some of the steps, such as step S118J, may be omitted. In the exemplary embodiment, where a matching document is found, the system favors the storage of an original, digital electronic version rather than one which has been scanned (copied) and the captured image 22 OCR'ed. This ensures that the clearest version is retained.

The documents processed by the ILMS 11 are archived in the archive 48 and are indexed for further search. The indexing may provide a full text indexing to allow the matching system 44 to retrieve documents that are exact matches (see, for example U.S. Pat. No. 7,370,034), or a specific indexing technique, which allows identification of duplicates, as disclosed, for example, in above mentioned U.S. Pub. No. 2008/0243842, may be used. An advantage of the first approach is its robustness to OCR errors, while the second approach is faster.

In the culling step (S122), the administrator is able to identify the matching documents based on the stored references which point to them. The Administrator may confirm that they are indeed matches by reviewing the documents on screen and confirm that the most clear version (generally a digital version from the shared or company files) should be stored in the archive. The administrator may then delete all other matches and/or earlier revisions permanently from the archive. The system 11 may prevent the administrator from deleting all versions of the document, requiring that at least one version be stored, except where it is flagged as being a public document.

Various advantages may be achieved by the exemplary method. For example some or all of the following may be achieved:

1. The number of stored duplicate images can be reduced by logging solely a reference to the document instead of storing an image, whenever possible. The reference may be a reference either on the archive 48 or on the company's file storage system(s) 56 by the DMS, or elsewhere in the system memory 60.

2. The number of stored documents can be reduced by discarding public information, that is, documents that anyone can access through the Web. In the case of publically available documents 52, an image for those documents is not stored, even if it is also found in other locations, such as company files. Rather, solely a reference to the public document is stored, which is marked as "external" information.

3. The searchability of the archive 48 can be improved by storing a digital version of the printed document, instead of storing the scanned image (and its OCRed content) whenever possible.

4. The volume of the archive 48 can be reduced by always storing, whenever possible, a digital version of a document found by the matching system (e.g., a Word version found in the file system 56 or shared documents 54), rather than a corresponding image created by the MFD 16, which generally occupies more memory.

5. The detection of possible information leakage can be provided by detecting if a document which has been or is about to be printed exists within the company network (e.g., stored in the company files 56 or shared documents 54) as a protected digital version. When a document is tagged as "Access Right Conflict" an ILMS administrator can be notified online. For example, an electronic message is automatically sent to the administrator, when the matching system identifies that a document received from the ILS matches such a document. In some embodiments, the MFD 16 is permitted to output (e.g., print or copy) a document which the matching system identifies as having a counterpart on the access control list. In other embodiments, the matching system 44/ILMS 11 is able to control the output of the MFD and thus prevent printing or copying of the document. This gives the creator of the original document the ability to control the output management of the documents stored through the DMS 57 by extending the access restrictions to copying and/or printing and/or scanning (and similar functions) and/or emailing and/or faxing the document on a multi-function printer 16.

For example, when a document is created, the document management system 57 may provide the creator with the opportunity to control the access list for users or groups of users of the DMS. For example, some users may be granted a read only privilege, with modify, print, fax, scan, and photocopy privileges being denied. Other users may be granted various ones, or all of these privileges, while some users may be denied all privileges. The document creator may be provided with the opportunity to change these privileges at a later time. The restrictions on privileges may be applied to shared documents as well as company restricted documents, with the opportunity to provide different privileges if the document is a shared document.

The following scenario illustrates a possible usage of this document output management application of the system: A user goes to the MFD 16 to copy a document D. The MFD sends the image of D to the ILMS 11. The matching system 44 detects that D exits (as a matching document) in a company file and the DMS indicates that it has restricted photocopy rights. A warning is generated, which can be sent to the user, logged in the ILS 30 and/or ILMS archive, sent to the DMS content owner, administrator, combination thereof or the like.

Although the matching system 44, or other component of the ILMS 11 may automatically remove matching documents from the archive, in the exemplary embodiment, the identified matches are simply tagged by the matching system and archived, either in the main archive 48 or in a defined storage location in the memory, allowing them to be culled by an administrator (S122). The culling of matching documents can then be handled as an off-line administration activity. For example, this may include the administrator punctually culling 'unofficial' early copies of official documents from the archive. This not only addresses the issue of the cost of storage, but also ensures that only the most up-to-date, and finally official, version of a set of official documents is kept and produced, in the event that the company is asked to produce documents in response to a discovery request.

The administration of the ILMS archive 48 can be performed periodically. For example, every week or day or month, a set OD of "official documents" is manually identified. These are the official and most recent versions of the documents that a company wishes to maintain at that time. This set may be defined by the person in charge of managing the company's intellectual property. Then for each document D in OD, a search is performed of the ILMS archive 11, for example with the matching system 44.

Let {V1, V2, . . . ,Vn} be the list of the n versions of D retrieved by the matching system (revisions of D with ≦100% similarity degree with D, which at least meet a predefined threshold similarity measure). For each Vi the administrator checks the log information (user ID, date, type of operation-scanning, printing, etc); if no data leakage is suspected, the document image pointed to by the log is replaced by the digital official version of D, or the record is simply deleted from the ILMS archive 48.

The described architecture of the system and disclosed method address the problems of the costs of storage on the archive server together with the problem of redundant and duplicate document storage. The apparatus and method also help in evaluating the degree of confidentiality attached to information processed by a multi-function device.

The exemplary ILMS 11 may be located at the company and under its control or it may be located elsewhere and under the control of a third party, which offers the management of documents and/or addresses leakage of information, as a service to the company.

The method illustrated in FIGS. 4 and 5 may be implemented in a computer program product that may be executed on a computer. The computer program product may be a tangible computer-readable recording medium on which a control program is recorded, such as a disk, hard drive. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other medium from which a computer can read and use. In other embodiments the program may be embodied in transmission media, such as acoustic or light waves, such as those generated during radio wave and infrared data communications, and the like, or may be a transmittable carrier wave in which the control program is embodied as a data signal.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIGS. 4 and 5, can be used to implement the method for processing and storing image logs.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for document management comprising:

automatically acquiring image logs for all input documents being processed by image output devices within an organization, each image log comprising image data and an associated record for an input document being processed by one of at least one image output device within the organization, whereby image data is automatically acquired for all documents being processed by the organization's image output devices, without provision for a user to select whether a document image should be logged;

automatically sending all of the image logs from the image output devices to an image log management system and storing the image logs in memory until a search for similar documents is performed;

for each of the acquired and stored image logs, performing the search for similar documents and automatically retrieving similar documents, including identifying keywords extracted from the acquired image data, and based on the keywords, performing a search among previously acquired documents archived in a computer readable storage medium and accessible electronic documents stored in at least one other document repository to retrieve similar documents; and where a similar document is retrieved, computing a measure of similarity between the retrieved similar document and the input document; and based on the computed similarity, determining whether the retrieved document is a matching document and, if so, storing a location of the retrieved matching document whereby for the input document, a location of each retrieved matching document is stored; and providing a procedure for ensuring that a single version of the input document is archived in the computer-readable storage medium, the version being selected from the captured image data and any identified matching documents, except optionally where the job log indicates that at least one of the retrieved matching document locations is a public document source;

the method further comprising:

where the retrieved document has access controls, including a reference to the access controls of the retrieved document in the stored job log and further including at least one of:

a) storing user information from the record of the image log in the stored job log, whereby a leak of an access controlled document is attributable to the user which caused the input document to be processed by the image output device; and b) blocking processing of the input document by the image output device where the access controls of the retrieved matching document indicate that such processing should be blocked.

2. The method of claim 1, wherein the extraction of keywords includes:

identifying a set of text elements extracted from text content of the image data, and from these text elements, identifying a subset of the text elements as keywords, the keywords including text elements which have a frequency of occurrence in the text content which is different from previously computed term frequencies of these text elements.

3. The method of claim 2, wherein the identifying of set of text elements includes performing optical character recognition of the image data to identify the text content of the document.

4. The method of claim 1, wherein the at least one other document repository includes at least one of a company file system, a shared document repository, and a publically available document source.

5. The method of claim 1, wherein at least one of the at least one image output devices is a multifunction device and wherein for documents processed by scanning or copying, the associated record includes a detected identity of a person performing the scanning.

6. The method of claim 1, wherein the automatically acquiring image data includes acquiring the images from the image output device or from a print server communicatively linked to the image output device.

7. The method of claim 1, wherein the similarity computation classifies retrieved documents having a threshold computed similarity as being a match, a revision, or a related document.

8. The method of claim 7, wherein when a retrieved document is classed as a revision, a most recent of the input document and retrieved document is identified for substituting for the retrieved document in the archive.

9. The method of claim 1, wherein a job log is stored for each acquired image log, the job log comprising information from the record of the image log and information which points to one of an archived document and a public document.

10. The method of claim 1, wherein the providing for only one of the retrieved document and the input document to be archived in the computer-readable storage medium includes providing for an administrator to confirm that the retrieved document is a matching document.

11. The method of claim 1, wherein the procedure for ensuring that a single version of the input document is archived in the computer-readable storage medium includes:

if at least one location of a matching document points to a Web location then the log is tagged to indicate that it is public information for which an image need not be archived;

otherwise, if there is no matching document whose location points to a digital file version of the input document, then archiving an image of the input document linked to the job log;

otherwise, if at least one location is a digital file which is not a publically accessible document, and if none of the locations points to a previously archived digital file version, then archiving the digital file version and linking it to the job log which is tagged to indicate that it is internal information; and optionally, if an authenticated print user, identified from at least one of an IP address and User name stored in the job log, has not been granted image output privileges comprising at least one of scanning, copying, faxing, printing, and emailing the digital file version, tagging the job log to indicate that there is an access right conflict.

12. A computer program product comprising a non-transitory recording medium encoding instructions, which when executed on a computer causes the computer to perform the method of claim 1.

13. A computer implemented system for performing the method of claim 1 comprising software instructions stored in memory for performing the method and at least one processor, in communication with the memory, for executing the instructions.

14. A computer implemented system for document image log acquisition and retrieval comprising:

a capturing component which automatically acquires an image log comprising image data and an associated record for every input document being processed by a plurality of image output devices, the image output devices comprising printers and the input document processing including printing;

an archiving component configured for receiving the acquired image data and associated records from the capturing component and archiving the image data and records in an associated archive until processed by a matching system;

the matching system which, for each of the acquired image logs:

automatically identifies any similar documents, including identifying a set of text elements extracted from text content of the image data, and from these text elements, identifies a subset of the text elements as keywords, the keywords including text elements which have a frequency of occurrence in the text content which is different from previously computed term frequencies of these text elements, and based on the keywords, performs a search among previously acquired image logs archived in a computer-readable storage medium and accessible electronic documents stored in at least one other document repository to retrieve similar documents; and where a similar document is retrieved, computes a measure of similarity between the retrieved similar document and the input document; and based on the computed similarity, determines whether the retrieved document is a matching document and, if so, stores a job log which includes, for the input document, information from the record of the image log and a location of the retrieved document;

whereby either the retrieved document or the input document is identified for being automatically or manually archived in the computer-readable storage medium, except where the job log indicates that the location of the retrieved document is a public document source, neither a retrieved nor an input document need be identified for archiving;

where the retrieved document has access controls, including a reference to the access controls of the retrieved document in the stored job log and at least one of:
a) storing user information from the record of the image log in the stored job log, whereby a leak of an access controlled document is attributable to the user which caused an input document to be processed by the image output device; and
b) blocking processing of the input document by the image output device where the access controls of the retrieved matching document indicate that such processing should be blocked; and a processor which implements the capturing component, archiving component and the matching system.

15. The system of claim 14, wherein the capturing component includes an OCR processing component which processed the acquired document images to identify the text content.

16. The system of claim 14, wherein the capturing component, archiving component, and matching component are maintained at a location remote from the image output device.

17. A method for document management, comprising:
automatically capturing image logs comprising images and job information for all jobs processed by at least one image output device, without provision for a user to select whether the images should be logged, the jobs comprising input documents being printed, copied, scanned, and faxed by any one of a plurality of image output devices within an organization, the image output devices being selected from printers, copiers, scanners, fax machines and multifunction devices;
for each job for which an image log is captured, automatically determining whether a similar document exists by searching in:
a) an archive which includes previously captured document images or digital versions thereof;
b) the organization's document file system;
c) optionally a repository of shared documents; and
d) public documents;
if a similar document is found to exist, automatically determining whether it is a matching document having a high degree of similarity with the input document or a revision having a lesser degree of similarity with the input document; and
where the similar document is found to be a matching document, storing a location of the similar document;
when the matching document is a digital document which is not already in the archive, providing for the digital document to be added to the archive and linked to a stored job record for the input document, enabling the images of the image log for the input document to be discarded;
where the retrieved similar or matching document has access controls, including a reference to the access controls of the retrieved document in the stored job log and further including at least one of:
a) storing user information from the record of the image log in the stored job log, whereby a leak of an access controlled document is attributable to the user which caused an input document to be processed by the image output device; and
b) blocking processing of the input document by the image output device where the access controls of the retrieved matching document indicate that such processing should be blocked.

18. The method of claim 17, wherein when the similar document is a revision, providing for revision to be replaced in the archive by the input document images.

* * * * *